United States Patent
Bolen et al.

(10) Patent No.: US 11,341,076 B2
(45) Date of Patent: *May 24, 2022

(54) HOT-PLUGGED PCIE DEVICE CONFIGURATION SYSTEM

(71) Applicant: Dell Products L.P., Round Rock, TX (US)

(72) Inventors: Austin Patrick Bolen, Austin, TX (US); Vijay Bharat Nijhawan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/102,591

(22) Filed: Nov. 24, 2020

(65) Prior Publication Data

US 2021/0081349 A1 Mar. 18, 2021

Related U.S. Application Data

(63) Continuation of application No. 15/706,382, filed on Sep. 15, 2017, now Pat. No. 10,853,299.

(51) Int. Cl.
*G06F 13/40* (2006.01)
*G06F 9/4401* (2018.01)

(52) U.S. Cl.
CPC ........ *G06F 13/4081* (2013.01); *G06F 9/4411* (2013.01); *G06F 9/4413* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 8,266,383 | B1 | 9/2012 | Minkin et al. |
| 9,262,270 | B2 * | 2/2016 | Jayaprakash Bharadwaj ............... G06F 11/0745 |
| 9,626,207 | B2 | 4/2017 | Graham et al. |

(Continued)

OTHER PUBLICATIONS

Manjunath Am and Austin P. Bolen, "Systems and Methods for Configuration of Hot-Inserted Device Prior to Operating System Control of Device," U.S. Appl. No. 15/384,951, filed Dec. 20, 2016, 30 Pages.

*Primary Examiner* — Henry Tsai
*Assistant Examiner* — Christopher A Bartels
(74) *Attorney, Agent, or Firm* — Joseph Mencher

(57) ABSTRACT

A hot-plugged PCIe device configuration system includes a PCIe device with a PCIe configuration space having PCIe configuration space registers. A computing system includes a PCIe connector and a PCIe setting record database storing a first PCIe setting record having a first register write location value and first register value information. The computing system detects that the PCIe device has been hot-plugged into the PCIe connector, and uses the first register write location value in the first PCIe setting record to determine a location in the PCIe configuration space that provides a first PCIe configuration space register. The computing system then uses the first register value information in the first PCIe setting record to determine at least one register value change for the first PCIe configuration register, and writes the at least one register value change to the first PCIe configuration space register using the location.

20 Claims, 6 Drawing Sheets

(56) References Cited

U.S. PATENT DOCUMENTS

| | | |
|---|---|---|
| 9,842,075 B1 | 12/2017 | Davis et al. |
| 2009/0133028 A1* | 5/2009 | Brown ................ G06F 9/45558 718/104 |
| 2011/0185103 A1 | 7/2011 | Evoy et al. |
| 2011/0185163 A1 | 7/2011 | Hidaka |
| 2012/0072633 A1* | 3/2012 | Elboim ............... G06F 13/4081 710/302 |
| 2013/0346655 A1 | 12/2013 | Glaser |
| 2014/0304475 A1 | 10/2014 | Ramanujan et al. |
| 2016/0117279 A1* | 4/2016 | Borikar ............... G06F 13/4022 710/316 |
| 2017/0242686 A1* | 8/2017 | Vidyadhara ............. G06F 8/656 |
| 2017/0300442 A1* | 10/2017 | Xue ........................ G06F 13/40 |
| 2018/0004701 A1 | 1/2018 | Pappu et al. |
| 2018/0004702 A1 | 1/2018 | Pappu et al. |
| 2018/0007032 A1 | 1/2018 | Pappu et al. |
| 2018/0095127 A1 | 4/2018 | Pappu et al. |
| 2018/0096735 A1 | 4/2018 | Pappu et al. |
| 2018/0096979 A1 | 4/2018 | Pappu et al. |
| 2018/0321948 A1* | 11/2018 | Vaquero .................. G06F 13/00 |
| 2019/0041898 A1* | 2/2019 | Harriman ............. H04B 1/7073 |
| 2019/0179788 A1* | 6/2019 | Hammer ............. G06F 9/45558 |

\* cited by examiner

HOT-PLUGGED PCIE DEVICE CONFIGURATION SYSTEM

CROSS-REFERENCE TO RELATED APPLICATIONS

The present disclosure is a continuation of U.S. patent application Ser. No. 15/706,382, Attorney Docket No. 16356.1872US01, filed on Sep. 15, 2017, the disclosure of which is incorporated by reference herein in its entirety.

BACKGROUND

The present disclosure relates generally to information handling systems, and more particularly to configuring a Peripheral Component Interconnect express (PCIe) device that has been hot-plugged into an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, desktop computing systems, laptop/notebook computing systems, server computing systems, and/or other computing systems known in the art, sometimes include Peripheral Component Interconnect express (PCIe) devices that provide hardware interfaces that allow peripheral components to be coupled to the computing system. Such PCIe devices include PCIe configuration spaces with PCIe configuration space registers that may be configured by the computing system in order to make platform-specific changes to the PCIe device. For example, when the computing system is booted with a PCIe device already connected to that computing system, the platform firmware (e.g., a Basic Input/Output System (BIOS), the Unified Extensible Firmware Interface (UEFI), etc.) may operate to make changes to the PCIe configuration space registers to provide the platform-specific changes discussed above. One particular example of a platform-specific change to the PCIe configuration space register in a PCIe device is the setting of the completion timeout value (a PCIe specification-defined parameter), which may be used to indicate that a non-posted request was issued to an endpoint and that non-posted request did not return a completion in time (i.e., a timer is begun when the non-posted request is issued, and the non-posted request is not completed in a time period defined by the completion timeout value, resulting in a completion timeout error.) However, when a PCIe device is hot-plugged into the computing system (e.g., when the PCIe device is connected to a PCIe bus while the computing system is in a runtime state with the Operating System (OS) controlling operations of the computing system), the opportunity for the platform firmware to make platform-specific changes to the PCIe device (i.e., during boot) is not presented. The hot-plugging of PCIe devices in computing systems can raise issues, particularly with the setting of PCIe configuration space registers with values that are platform dependent (e.g., the completion timeout values discussed above), as the OS will not attempt to set platform dependent values in the PCIe configuration space registers.

The Advanced Configuration and Power Interface (ACPI) specification allows the platform firmware to provide for platform-specific changes to a PCIe device that has been hot-plugged into a computing system using what is referred to as the Hot Plug Parameter Extensions ("_HPX") method. The _HPX method defines PCIe setting records that include "AND masks" and "OR masks", and during the boot of the computing system, the platform firmware provides those setting records to the OS for use in programming the PCIe configuration space registers for PCIe devices that are hot-plugged into the computing system. However, those setting records are static, defining particular PCIe configuration space registers whose locations in the PCIe configuration space must be previously known to the OS in the computing system in order to correctly provide changes to the PCIe configuration space registers according to the values provided with the AND masks and OR masks. Currently, the _HPX method only includes PCIe configuration space registers defined in the PCIe specification version 1.1, and thus does not support platform specific changes by the OS to PCIe configuration space registers that were added after the PCIe specification version 1.1 (e.g., the completion timeout values discussed above.)

Accordingly, it would be desirable to provide an improved hot-plugged PCIe device configuration system.

SUMMARY

According to one embodiment, an Information Handling System (IHS) includes a Peripheral Component Interconnect express (PCIe) connector; a processing system that is coupled to the PCIe connector; and a memory system that is coupled to the processing system and that includes instructions that, when executed by the processing system, cause the processing system to provide an operating system engine that is configured to: detect that a PCIe device has been hot-plugged into the PCIe connector; use a first register write location value in a first PCIe setting record to determine a location in a PCIe configuration space that provides a first PCIe configuration space register of a plurality of PCIe configuration space registers included in the PCIe configuration space; use first register value information in the first PCIe setting record to determine at least one register value change for the first PCIe configuration register; and write the at least one register value change to the first PCIe configuration space register using the location.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
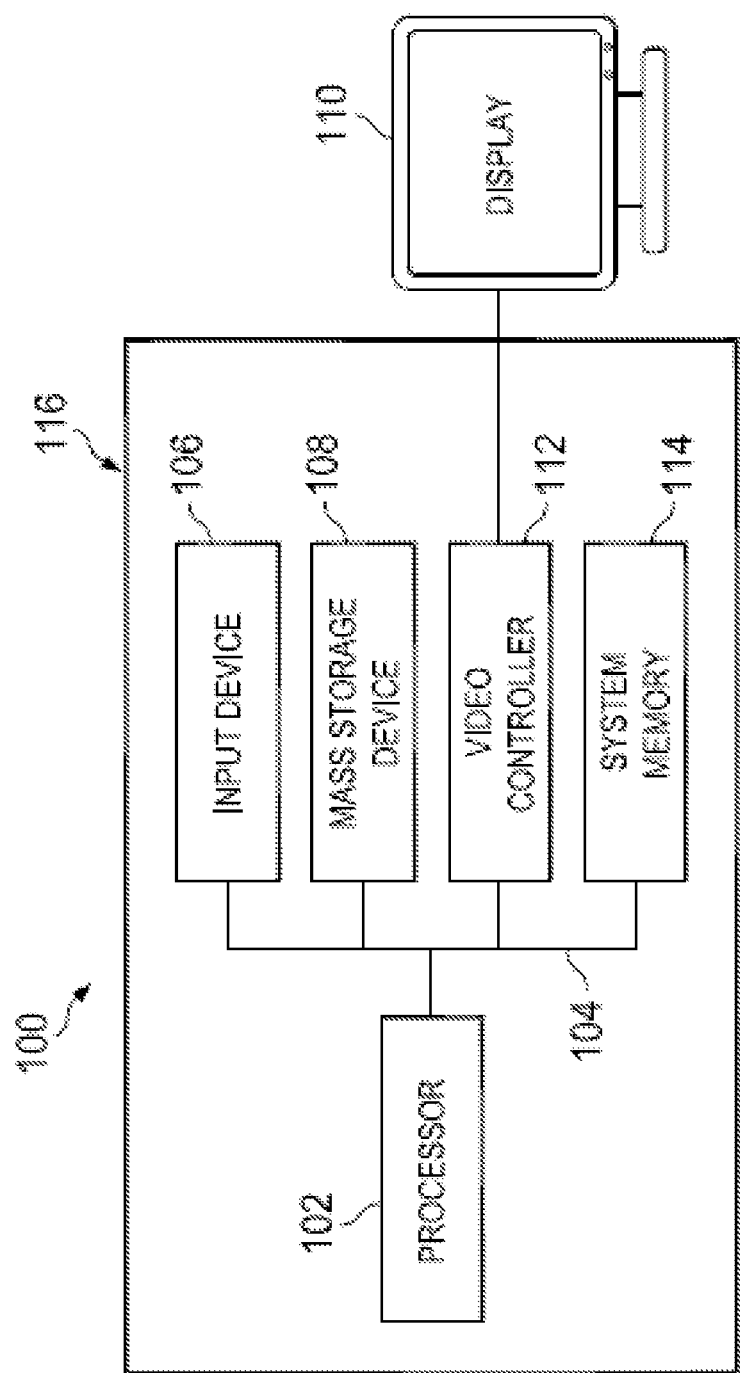
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard disks, optical disks, magneto-optical disks, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
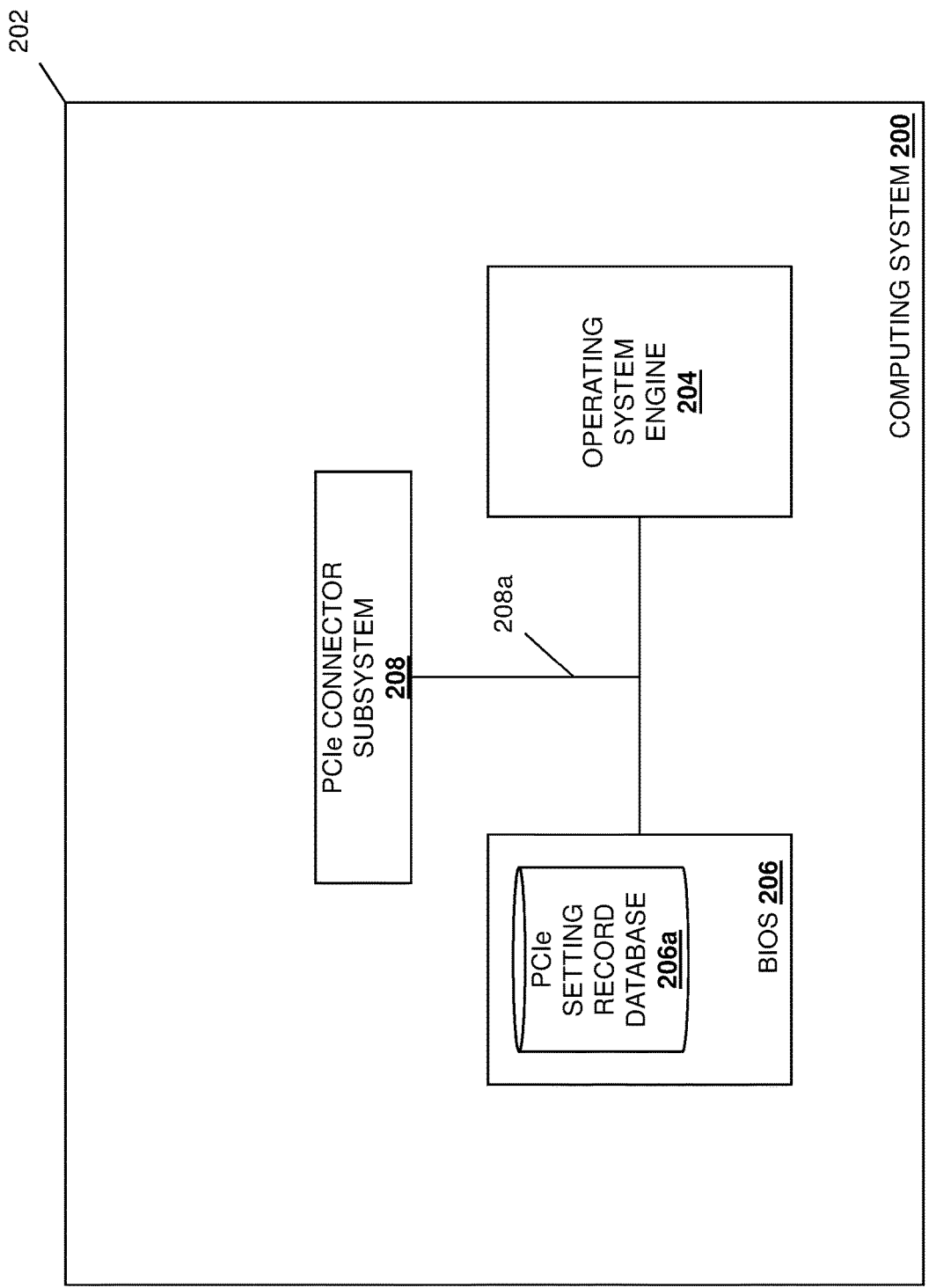
FIG. 2 is a schematic view illustrating an embodiment of a computing system.

Referring now to FIG. 2, an embodiment of a computing system 200 is illustrated. In an embodiment, the computing system 200 may be the IHS 100 discussed above with reference to FIG. 1, and/or may include some or all of the components of the IHS 100. In the specific examples discussed below, the computing system 200 may be provided by a desktop computing system, a laptop/notebook computing system, and/or a server computing system. However, one of skill in the art in possession of the present disclosure will recognize that other types of computing systems such as networking systems, storage systems, mobile devices, and/or other devices may benefit from the teachings of the present disclosure as thus will fall within its scope as well. In the illustrated embodiment, the computing system 200 includes a chassis 202 that houses the components of the computing system 200, only some of which are illustrated in FIG. 2. For example, the chassis 202 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide an operating system engine 204 that is configured to perform the functions of the operating system engines and/or at least some of the functions of the computing systems discussed below.

The chassis 202 may also house a Basic Input/Output System (BIOS) 206 that is coupled to the operating system engine 204 (e.g., via a coupling between the processing system and the BIOS 206) and that is configured to perform the functions of the BIOS and/or at least some of the functions of the computing systems discussed below. As such, one of skill in the art in possession of the present disclosure will recognize that, in addition to performing the functionality discussed below, the BIOS 206 may include non-volatile firmware that is configured to perform hardware initialization during a booting process for the computing system 200, as well as provide runtime services for the operating system engine 204 and/or other programs provided on the computing system 200. As would be understood by one of skill in the art in possession of the present disclosure, the BIOS may be replaced by a Unified Extensible Firmware Interface (UEFI) and/or any other type of platform initialization firmware (e.g., Coreboot available at https://www.coreboot.org/) while remaining within the scope of the present disclosure. In the illustrated embodiment, the BIOS 206 includes a PCIe setting record database 206a, which may be provided on a storage device included in the BIOS 206. However, in some embodiments, the PCIe setting record database 206a may be provided on a storage device that is separate from and coupled to the BIOS 206 while remaining within the scope of the present disclosure.

In an embodiment, the PCIe setting record database 206a may include a plurality of PCIe setting records. In a specific example, one or more of the PCIe setting records in the PCIe setting record database 206a may include information defined by the following content in Table A below:

| Field | Object Type | Definition |
| --- | --- | --- |
| Header: | | |

-continued

| Field | Object Type | Definition |
| --- | --- | --- |
| Type | Integer | 0x0X: Type X (new PCIe) setting record. |
| Revision | Integer | 0x01: Revision 1, defining the set of fields below. |
| Register Offset | Integer | Offset of the PCIe configuration space register in the PCIe configuration space. |
| AND Mask | Integer | Bits 0 to 31 contain the AND mask to be used by the operating system engine to program the PCIe configuration space register. |
| OR Mask | Integer | Bits 0 to 31 contain the OR mask to be used by the operating system engine to program the PCIe configuration space register. |

In the embodiments discussed below, register offset information provided according to the register offset row in Table A above may be referred to as register location information, and such register location information may be provided in a PCIe setting record along with the set of AND and OR masks that are included in that PCIe setting record. In another specific example, one or more of the PCIe setting records in the PCIe setting record database 206a may include information defined by the following content in Table B below:

| Field | Object Type | Definition |
| --- | --- | --- |
| Header: | | |
| Type | Integer | 0x0Y: Type Y (new PCIe Capability) setting record. |
| Revision | Integer | 0x01: Revision 1, defining the set of fields below. |
| Extended Capability | Integer | A value of 0 indicates the PCIe configuration space register is located in a capability structure of the PCIe configuration space; a value of 1 indicates the PCIe configuration space register resides in an extended capability structure of the PCI configuration space. All other values are reserved. |
| PCIe Capability ID | Integer | PCIe Capability ID indicates a start point for the PCIe configuration space register in the capability structure or extended capability structure. |
| Register Offset | Integer | Offset of the PCIe configuration space register relative to start point for the PCIe configuration space register in the capability structure or extended capability structure. |
| AND Mask | Integer | Bits 0 to 31 contain the AND mask to be used by the operating system engine |
| OR Mask | Integer | Bits 0 to 31 contain the OR mask to be used by the operating system engine |

In some of the embodiments discussed below, capability structure information provided according to the extended capability row in Table B above, capability identification information provided according to the PCIe Capability ID row in Table B above, and register offset information provided according to the register offset row in Table B above, may be referred to as register location information, and such register location information may be provided in a PCIe setting record along with the set of AND and OR masks that are included in that PCIe setting record. However, while two specific content tables that may be used to define information in the PCIe setting records included in the PCIe setting record database 206a, one of skill in the art in possession of the present disclosure will recognize how other types of setting records may include similar information, or information that provides functionality that is similar to that described below, while remaining within the scope of the present disclosure.

The chassis 202 also houses a PCIe connector subsystem 208 that is coupled to the BIOS 206 and to the operating system engine 204 (e.g., via a coupling such as the PCIe bus 208a of the illustrated embodiment that extends between the PCIe connector subsystem 208 and the processing system 204.) While the PCIe connector subsystem 208 is described below as connecting to a single PCIe device, one of skill in the art in possession of the present disclosure will recognize that PCIe connector subsystems may (and typically will) include a plurality of PCIe connectors that are configured to connect to a plurality of PCIe devices while remaining within the scope of the present disclosure. Furthermore, while a specific computing system 200 has been illustrated and described, one of skill in the art in possession of the present disclosure will recognize that computing systems may include a variety of other components and/or component configurations that may provide for conventional computing system functionality, as well as the functionality discussed below, while remaining within the scope of the present disclosure.

Figure 3:
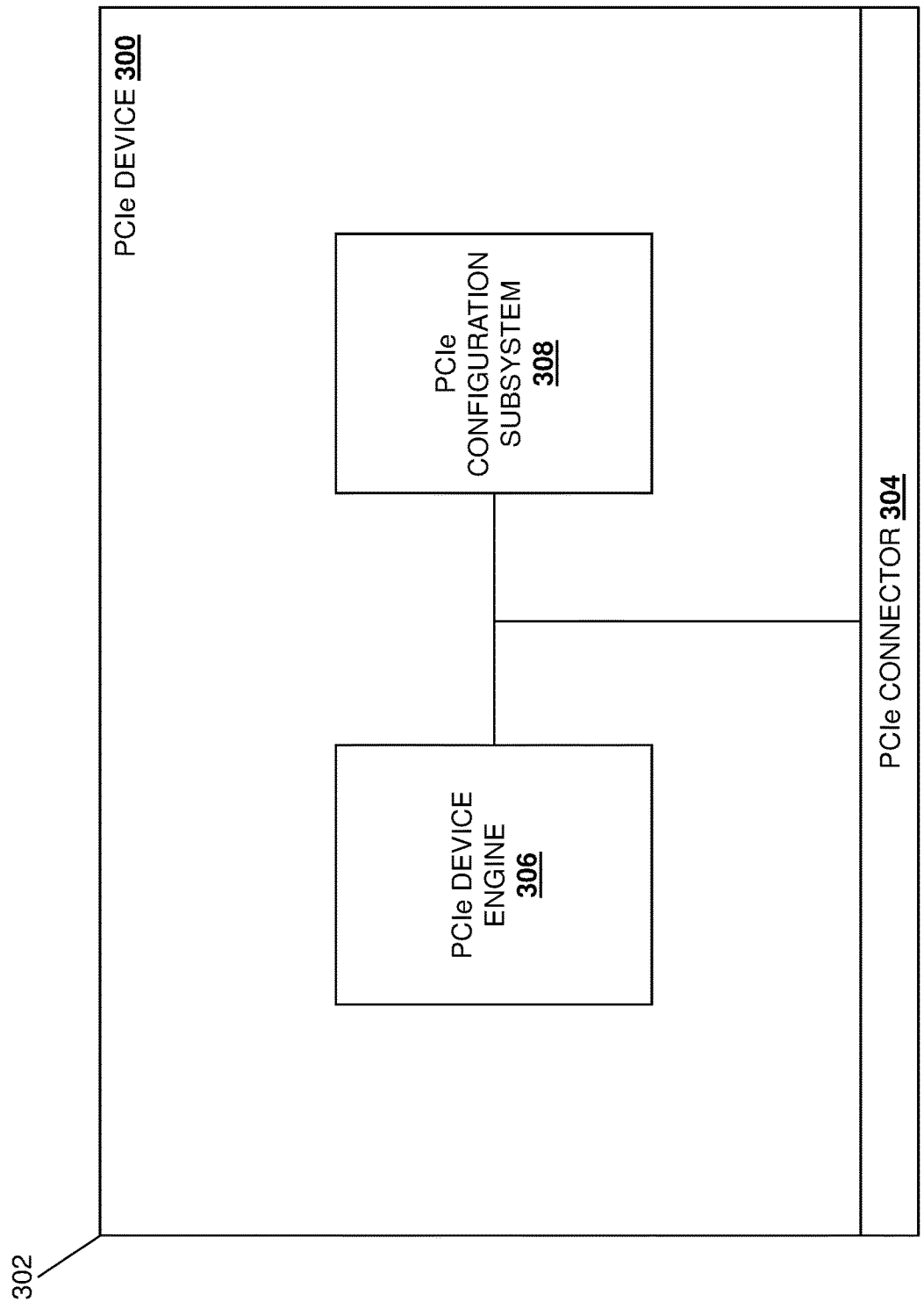
FIG. 3 is a schematic view illustrating an embodiment of a PCIe device.

Referring now to FIG. 3, an embodiment of a PCIe device 300 is illustrated. In an embodiment, the PCIe device 300 may be the IHS 100 described above with reference to FIG. 1, and/or may include or be provided as one or more of the components of the IHS 100. In a specific example, the PCIe device 300 may be a PCIe expansion card that utilizes the PCIe high-speed serial computer expansion bus standard provided in specifications available from the Peripheral Component Interconnect Special Interest Group (PCI SIG) of Beaverton, Oreg., United States. However, other types of devices may benefit from the teachings of the present disclosure and thus are envisioned as falling within its scope as well. In the illustrated embodiment, the PCIe device 300 includes a base 302 that supports the components of the PCIe device 300, only some of which are illustrated in FIG. 3. For example, in the illustrated embodiment, the base 302 supports a PCIe connector 304 that is configured to connect to the PCIe connector subsystem 208 in the computing system 200. One of skill in the art will recognize that, in the embodiment illustrated in FIG. 3, the base 302 may be provided by a circuit board, although other types of chassis and chassis components that are configured to support the PCI device components discussed below will fall within the scope of the present disclosure as well.

The base 302 of the PCIe device 300 may also support a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a PCIe device engine 306 that is configured to perform the functions of the PCIe device engines and PCIe devices discussed below. As illustrated, the PCIe device engine 306 may be coupled to the PCIe connector 304 (e.g., via a connection between the processing system and the PCIe connector 304.) The base 302 on the PCIe device 300 may also support a storage system (not illustrated, but which may include the storage device 108 discussed above with reference to FIG. 1) that provides, at least in part, a PCIe configuration subsystem 308. As illustrated, the PCIe configuration subsystem 308 may be coupled to the PCIe connector 304 and the PCIe device engine 306 (e.g., via a connection between the processing system and the storage system).

In an embodiment, the PCIe configuration subsystem 308 may provide a PCIe configuration space that includes a plurality of PCIe configuration space registers, any or all of which may be configurable (e.g., by changing the values provided in the PCIe configuration space register.) In some of the examples discussed below, the first 256 bytes of the PCIe configuration space includes a capability structure having a plurality of PCIe configuration space registers, while an extended capability structure having a plurality of PCIe configuration space registers is provided in the PCIe configuration space following the capability structure. However, other configurations of the PCIe configuration space will fall within the scope of the present disclosure as well. Examples of PCIe configuration space registers include uncorrectable error status registers, uncorrectable error mask registers, uncorrectable error severity registers, correctable error status registers, correctable error mask registers, advanced capabilities and control registers, header log registers, error source identification registers, correctable error source identification registers, Transaction Layer Packet (TLP) prefix log registers, and/or other PCIe configuration space registers that would be apparent to one of skill in the art in possession of the present disclosure. While a specific example of a PCIe device 300 has been described, one of skill in the art in possession of the present disclosure will recognize that PCIe devices may include a variety of different components in a variety of different configurations in order to provide conventional PCIe functionality, as well as the functionality discussed below, while remaining within the scope of the present disclosure.

Figure 4:
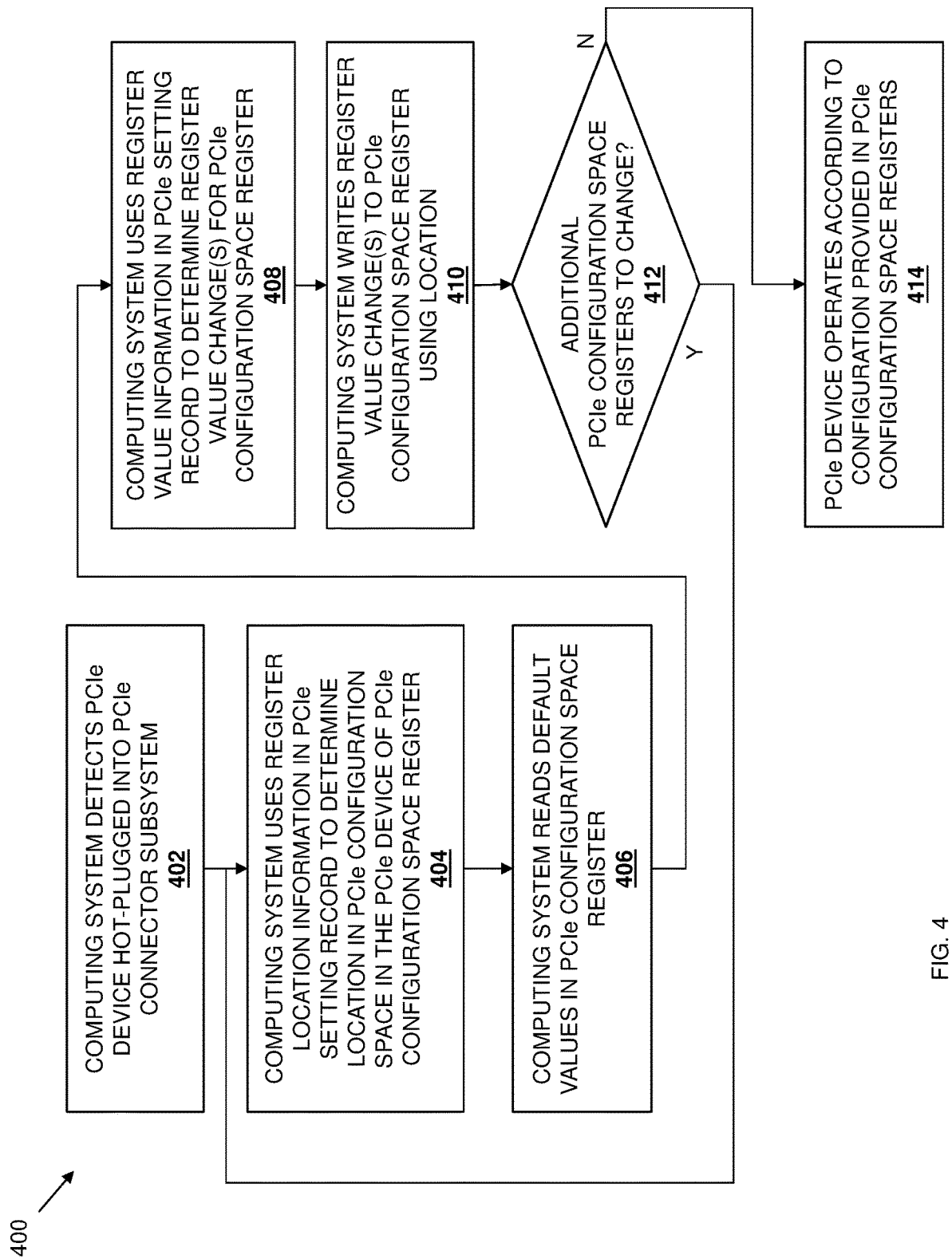
FIG. 4 is a flow chart illustrating an embodiment of a method for configuring a hot-plugged PCIe device.

Referring now to FIG. 4, an embodiment of a method 400 for configuring a hot-plugged PCIe device is illustrated. As discussed below, the systems and methods of the present disclosure provide for the configuration of PCIe configuration space registers in a PCIe device that has been hot-plugged into a computing system, and that configuration may be performed using PCIe setting records that specify the location of a PCIe configuration space register that may have a fixed offset in the PCIe configuration space, or that may be reside within a capability structure or extended capability structure within the PCIe configuration space. One of skill in the art in possession of the present disclosure will recognize that the PCIe setting records and associated functionality described herein provide several benefits over conventional PCIe setting records that are static such that they only allow for the configuration of particular PCIe configuration space registers (defined in the PCIe specification version 1.1) whose locations within the PCIe configuration space are previously known to the OS in the computing system. As such, rather than extend the conventional PCIe setting records in the _HPX method to include new PCIe setting records (whose locations would then need to be programmed into the OS as well), the use of PCIe setting records described herein allows for the configuration of PCIe configuration space registers that are not pre-defined (e.g., in the PCIe specification version 1.1), and supports platform specific changes by the OS to PCIe configuration space registers added after the PCIe specification version 1.1, as well as any future PCIe configuration space registers that may be added to the PCIe configuration space.

Figure 5:
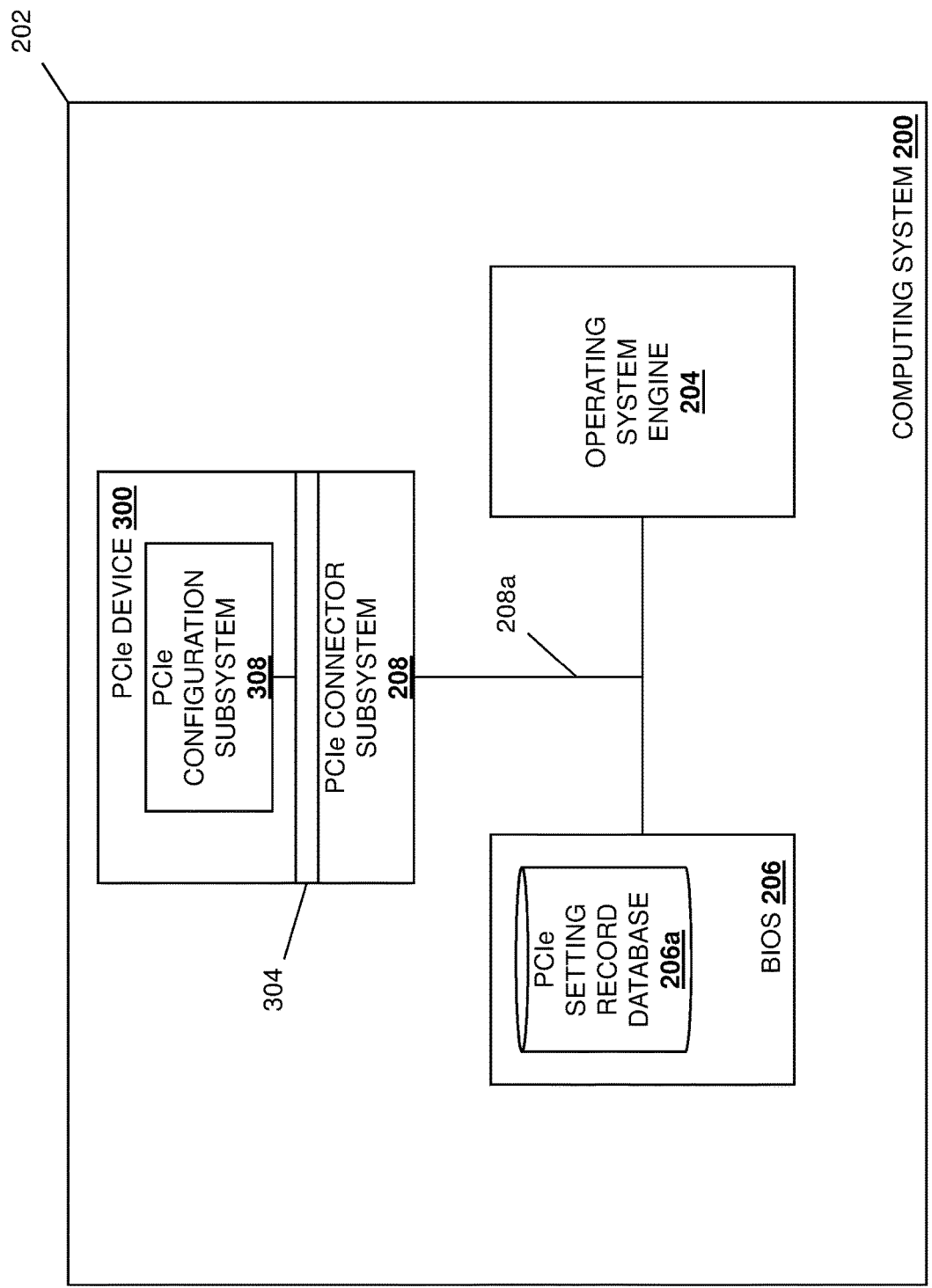
FIG. 5 is a schematic view illustrating an embodiment of a hot-plugged PCIe device configuration system that includes the PCIe device of FIG. 3 connected to the computing system of FIG. 2.

The method 400 begins at block 402 where a computing system detects the hot-plugging of a PCIe device into a PCIe connector subsystem. With reference to FIG. 5, in an embodiment of block 402 and subsequent to the booting of the computing system 200 such that the computing system 200 is in a runtime state with the operating system engine 204 controlling operations of the computing system 200, the PCIe device 300 may be connected to the computing system 200 by mating the PCIe connector 304 on the PCIe device 300 to the PCI connector subsystem 208 in the computing system 200, thus providing a hot-plugged PCIe device configuration system. Such a connection that occurs subsequent to the booting of the computing system 200 and while the computing system 200 is in a runtime state with the operating system engine 204 controlling operations of the computing system 200 is referred to herein as "hot-plugging", although one of skill in the art in possession of the present disclosure will recognize that the hot-plugging of a device into a computing system may be defined in different ways while remaining within the scope of the present disclosure. As such, in an embodiment of block 402, the operating system engine 204 in the computing system 200 may operate to detect (e.g., via the PCIe bus 208a) that the PCIe device 300 has been hot-plugged into the PCIe connector subsystem 208.

The method 400 then proceeds to block 404 where the computing system uses register location information in a PCIe setting record to determine a location of a PCIe configuration space register in a PCIe configuration space. In an embodiment, prior to block 404 and in response to the booting of the computing system 200, the BIOS 206 provides at least one PCIe setting record from the PCIe setting record database 206a to the operating system engine 204, and those PCIe setting record(s) are stored by the operating system engine 204. In some embodiments, the operating system engine 204 may advertise its support for the PCIe setting records of the present disclosure in order to receive those PCIe setting record(s) from the BIOS 206. For example, Advanced Configuration and Power Interface (ACPI) specification defines an ownership change (_OSC) method that allows the BIOS 206 and the operating system engine 204 to establish ownership of the PCIe configuration space registers in PCIe devices, and bits may be added to the _OSC method in order to establish ownership of new PCIe configuration space register bits (e.g., those added since PCIe specification version 1.1, and those added in the future) and allow the operating system engine 204 to advertise support for the new PCIe setting records described herein.

Subsequently, at block 406, the operating system engine 204 may access a first PCIe setting record and retrieve register location information from that first PCIe setting record. The operating system engine 204 may then use that register location information to determine a location in the PCIe configuration space included on the PCIe device 300 of a first PCIe configuration space register. In a specific example, the register location information may be defined according to the register offset row in Table A above, and may be provided to identify PCIe configuration space registers that have a fixed offset in the PCIe configuration space. Thus, the registration location information defined according to the register offset row in Table A above may include a value or values that define an offset in the PCIe configuration space at which the first PCIe configuration space register may be accessed (or at which any register value changes should be written), and the operating system engine 204 may identify the location of the first PCIe configuration space register in the PCIe configuration space using that offset.

In another specific example, at block 406 the register location information may include capability structure information, capability identification information, and register offset information provided according to the extended capability row, PCIe Capability ID row, and register offset row in Table B above. The operating system engine 204 may then operate to identify locations in the PCIe configuration space of PCIe configuration space registers that are located within a PCIe capability structure or PCIe extended capability structure in the PCIe configuration space. As would be understood by one of skill in the art in possession of the present disclosure, the location of PCIe configuration space registers that are located in PCIe capability structures and extended capability structures may not be fixed or otherwise known a priori, and rather those locations may change across different computing system platforms. However, the register location information of the present disclosure provides the ability to determine the location of a PCIe configuration space register provided anywhere within a PCIe capability structure or an extended PCIe capability structure in a PCIe configuration space.

For example, the capability structure information provided according to the extended capability row in Table B above may include a "0" if the first PCIe configuration space register is located in a PCIe capability structure in the PCIe configuration space, and a "1" if the first PCIe configuration space register is located in a PCIe extended capability structure in the PCIe configuration space. Furthermore, the capability identification information provided according the PCIe Capability ID row in Table B above may identify a start point for the PCIe capability structure in the PCIe configuration space. Finally, the register offset information provided according to the register offset row in Table B above may include a value or values that define an offset from the start point of the PCIe capability structure in the PCIe configuration space that identifies the location of the first PCIe configuration space register. As such, the operating system engine 204 may identify the location of the first PCIe configuration space register in the PCIe device 300 by identifying whether the first PCIe configuration space register is in a capability structure or an extended capability structure, identifying the start point of that capability structure or extended capability structure in the PCIe configuration space, and using the offset from that start point to identify the location of the first PCIe configuration space register. While specific examples of determining the location of PCIe configuration space registers has been described, one of skill in the art in possession of the present disclosure will recognize that modifications to the techniques describe above and/or other techniques for determining the location of a PCIe configuration space register will fall within the scope of the present disclosure as well.

The method 400 then proceeds to block 406 where the computing system reads default values in the PCIe configuration space register in the PCIe device. In an embodiment, at block 404, the operating system engine 204 may operate to use the location determined at block 404 to read (e.g., via the PCIe bus 208a, the PCIe connector subsystem 208 and the PCIe connector 304) values that are included in the first PCIe configuration space register provided in the PCIe configuration space included in the PCIe configuration subsystem 308. In the examples provided herein, the values read from the first PCIe configuration space register are default values, although other values may fall within the scope of the present disclosure as well. At block 404, the operating system engine 204 may store the default values read from the first PCIe configuration space register.

The method 400 then proceeds to block 408 where the computing system uses register value information in the PCIe setting record to determine register value change(s) for the PCIe configuration space register. In an embodiment, at block 406, the operating system engine 204 may access the first PCIe setting record and use register value information from that first PCIe setting record to determine at least one register value change for the first PCIe configuration space register. For example, at block 406 the operating system engine 204 may utilize the AND mask in the first PCIe setting record to perform a bitwise AND operation on the default values read from the first PCIe configuration space register, and utilize the OR mask in the first PCIe setting record to perform a bitwise OR operation on the default values read from the first PCIe configuration space register, in order to determine a plurality of register value changes for the first PCIe configuration space register. Thus, in some embodiments, the register value changes may include changes to at least one of the default values read at block 406. In a specific example, the register value changes may include register value changes that set a completion timeout value (or other computing system platform specific configuration) for the PCIe device.

In some embodiments, the operating system engine 204 may be configured to override register value changes determined for a PCIe configuration space register. For example, if the operating system engine 204 is aware of an architected meaning for a bit in the first PCIe configuration space register that should be preserved (e.g., a bit marked "RsvdP"), the operating system engine 204 may operate to override a register value change determined at block 408. For example, an "AND value" for a bit that should be preserved may be set to "1" by the firmware, and an "OR value" of a bit that should be preserved may be set to "0" by the firmware, and the operating system engine 204 may operate to override any changes to those bits that are determined via the AND mask and/or OR mask in the first PCIe setting record.

The method 400 then proceeds to block 410 where the computing system writes the register value change(s) to the PCIe configuration space register using the location. In an embodiment, at block 410, the operating system engine 204 may operate to write the register value changes determined at block 408 to the location in the PCIe configuration space determined at block 404 such that those register value changes are written to the first PCIe configuration space register. As such, default values in the first PCIe configuration space register that were read at block 206 may be overwritten at block 410.

The method 400 then proceeds to decision block 412 where the computing system determines whether there are any other PCIe configuration space registers in the PCIe device to change. In an embodiment, the operating system engine 204 determines whether the BIOS provided any additional PCIe setting records in response to the booting of the computing system 200, and thus whether there are any additional PCIe configuration space registers to change. If, as decision block 412, the computing system determines that there are additional PCIe configuration space registers in the PCIe device 300 to change, the method 400 proceeds back to block 404, and continues to loop through blocks 404-412 using particular PCIe setting records to change corresponding PCIe configuration space registers until the computing system determines at decision block 412 that there are no additional PCIe configuration space registers in the PCIe device 300 to change. When it is determined at decision block 412 that there are no additional PCIe configuration space registers in the PCIe device 300 to change, the method 400 proceeds to block 414 where the PCIe device operates according to the configuration(s) provided in the PCIe configuration space register(s). Thus, at block 414, the PCIe device engine 306 may operate according to the configurations provided in the PCIe configuration space registers in the PCIe configuration space included in the PCIe configuration subsystem 308 in the PCIe device 300.

Thus, systems and methods have been described that provide for the configuration of PCIe configuration space registers in a PCIe device that has been hot-plugged into a computing system using PCIe setting records that are configured to specify a location in the PCIe configuration space of a PCIe device of any particular PCIe configuration space register that may have a fixed offset in the PCIe configuration space, or that may be reside within a capability structure or extended capability structure within the PCIe configuration space. The PCIe setting records and associated functionality described herein provide several benefits over conventional PCIe setting records that are static and that only allow for the configuration of particular PCIe configuration space registers defined in the PCIe specification version 1.1, as the locations in the PCIe configuration space of PCIe configuration space registers that are to be changed per the teachings of the present disclosure need not be previously known to the OS in the computing system. As such, the PCIe setting records and PCIe configuration space register functionality described herein allows for the configuration of PCIe configuration space registers that were not defined in the PCIe specification version 1.1, and thus supports platform specific changes by the OS to hot-plugged PCIe devices using PCIe configuration space registers that were added after the PCIe specification version 1.1, as well as any further PCie configuration space registers that may be added in the future.

Figure 6:
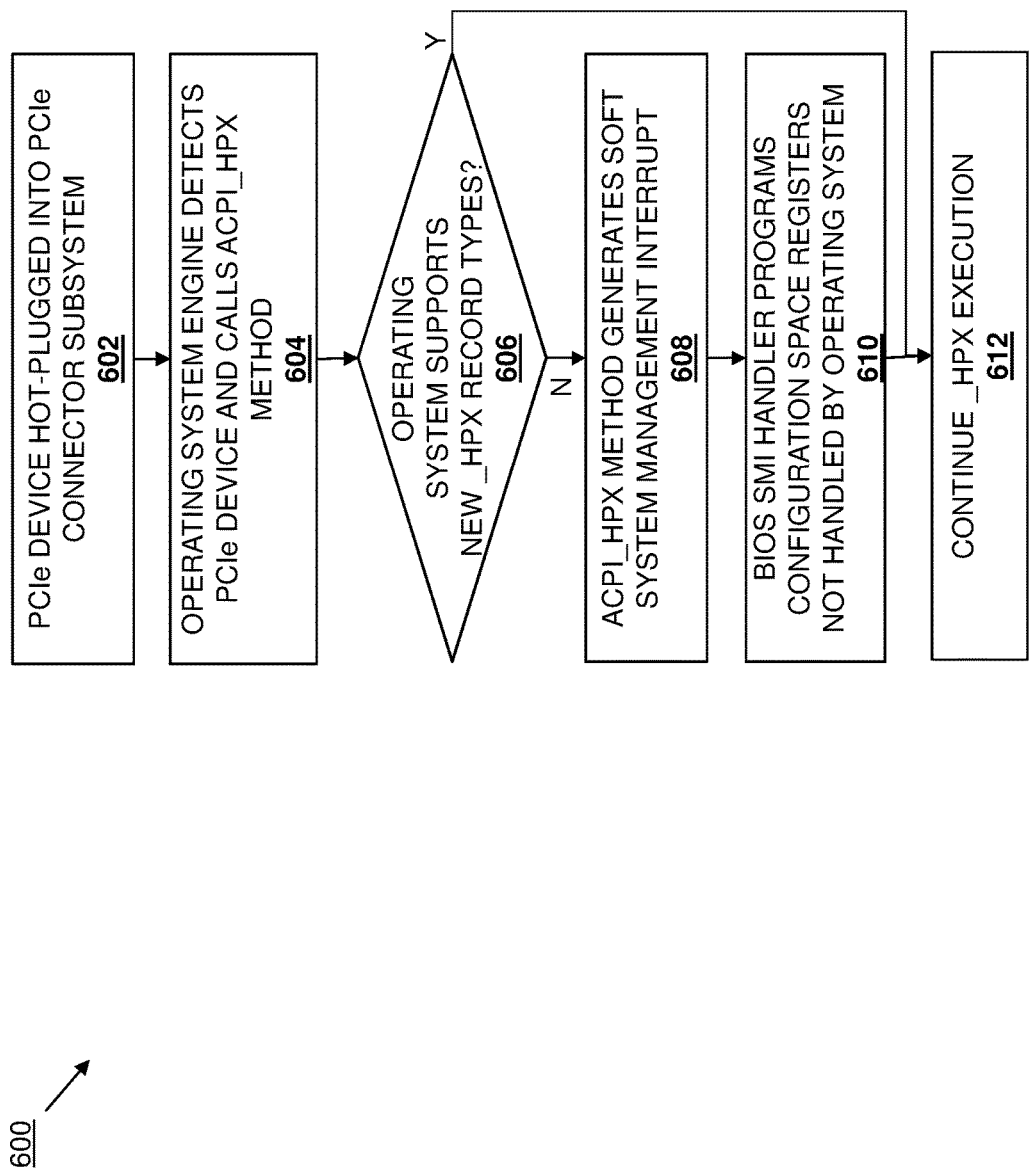
FIG. 6 is a flow chart illustrated a method for configuring a hot-plugged PCIe device via a Basic Input/Output System (BIOS) System Management Interrupt (SMI) handler in order to support an operating system that doesn't support the configuration method of FIG. 4.

One of skill in the art will recognize that the teachings above require support by the operating system engine 204, and thus the operating system engine 204 may require some modification (from conventional operating systems) to support the PCIe setting record functionality that provides the benefits described above. However, the benefits describes above may be realized without modifications to operating systems by, for example, enabling the PCIe configuration space register changes discussed above via the BIOS 206 and without support from the operating system engine 204. For example, FIG. 6 illustrates a method 600 for configuring a hot-plugged PCIe device via a Basic Input/Output System (BIOS) System Management Interrupt (SMI) handler in order to support an operating system that doesn't support the configuration method of FIG. 4. The method 600 begins at block 602 where the PCIe device is hot-plugged into the PCIe connector subsystem substantially as described above in with reference to block 402 of the method 400. In response to detecting a hot-plugged PCIe device 300, the method 600 proceeds to block 604 where the operating system engine 204 detects the PCIe device and calls an "ACPI_HPX" method (i.e., a BIOS-enabled _HPX method.) The method 600 then proceeds to decision block 606 where it is determined whether the operating system engine 204 supports the new _HPX record types discussed above. If it is determined that the operating system engine 204 supports the new _HPX record types at decision block 606, the method 600 proceeds to block 612 where _HPX execution continues substantially as described above with reference to the method 400.

However, if it is determined that the operating system engine 204 does not support the new _HPX record types at decision block 606, the method 600 proceeds to block 608 where operating system engine 204 executes the _HPX method (e.g., as would be understood by one of skill in the art in possession of the present disclosure, _HPX routines are written in an interpreted language (ASL) and provided by the BIOS, but it is the operating system (OS) that executes that _HPX routines using an interpreter.) Execution of the _HPX method generates a soft System Management Interrupt (SMI), which results in the method 600 proceeding to block 610 where a BIOS SMI handler uses the PCIe settings records of the present disclosure to program the PCIe configuration space registers (which are not handled by the operating system engine 204) in substantially the same manner described above. The method 600 then proceeds to block 612 where _HPX execution continues substantially as described above with reference to the method 400. In some embodiments, the BIOS 206 may utilize the Level control method (_Lxx) to perform this functionality as well. Furthermore, some embodiments may combine the OS-based PCIe configuration space register changes (i.e., as describe above in the method 400) with the BIOS-based PCIe configuration space register changes (i.e., the ACPI_HPX method described in the method 600) by allowing the operating system engine 204 to perform those changes when it supports the new PCIe setting records described herein, and allowing the BIOS to perform those changes when the operating system does not support the new PCIe setting records described herein.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A hot-plugged Peripheral Component Interconnect express (PCIe) device configuration system, comprising:
    a PCIe device including a PCIe configuration space; and
    a computing system that includes:
        a PCIe connector;
        a PCIe setting record database including a first PCIe setting record having a first register write location value and first register value information; and
        an operating system coupled via a processing system to the PCIe connector, wherein the operating system is configured to:
            receive, during initialization operations for the computing system, the first PCIe setting record;
            detect, during runtime operations for the computing system, that the PCIe device has been hot-plugged to the PCIe connector;
            determine, using the first register write location value in the first PCIe setting record, a location in the PCIe configuration space that provides a first PCIe configuration space register;
            determine, using the first register value information in the first PCIe setting record, at least one register value change for the first PCIe configuration space register; and
            write, using the location in the PCIe configuration space that provides the first PCIe configuration space register, the at least one register value change to the first PCIe configuration space register.

2. The system of claim 1, wherein the determining the at least one register value change for the first PCIe configuration register includes determining a plurality of register value changes for the first PCIe configuration space register using an AND mask and an OR mask included in the first register value information, and wherein the plurality of value changes are written to the first PCIe configuration space register using the location in the PCIe configuration space that provides the first PCIe configuration space register.

3. The system of claim 1, wherein the operating system is configured to:
read, prior to determining the at least one register value change for the first PCIe configuration register, the first PCIe configuration space register to identify a plurality of default values included in the first PCIe configuration space register, wherein at least one of the plurality of default values is overwritten with the at least one register value change.

4. The system of claim 1, wherein the first PCIe setting record includes capability structure information for the first PCIe configuration space register, and wherein the operating system is configured to:
determine, using the capability structure information and the first register write location value in the first PCIe setting record, the location in the PCIe configuration space that provides the first PCIe configuration space register.

5. The system of claim 4, wherein the capability structure information identifies whether the first PCIe configuration space register is located in a capability structure included in the PCIe configuration space, or located in an extended capability structure included in the PCIe configuration space.

6. The system of claim 4, wherein the first PCIe setting record includes a PCIe capability identifier for the first PCIe configuration space register, and wherein the operating system is configured to:
determine, using the capability structure information, a structure in the PCIe configuration space that includes the first PCIe configuration space register;
determine, using the PCIe capability identifier for the first PCIe configuration space register, a start point of the first PCIe configuration space register in the structure in the PCIe configuration space; and
determine, using the first register write location value in the first PCIe setting record, an offset from the start point that provides the location in the PCIe configuration space that provides the first PCIe configuration space register.

7. An Information Handling System (IHS), comprising:
a processing system; and
a memory system that is coupled to the processing system and that includes instructions that, when executed by the processing system, cause the processing system to provide an operating system engine that is configured to:
receive, during computing system initialization operations, a first PCIe setting record included in a PCI setting record database that is coupled to the processing system;
detect, during computing system runtime operations, that a PCIe device has been hot-plugged to a PCIe connector that is coupled to the processing system;
determine, using a first register write location value in the first PCIe setting record, a location in a PCIe configuration space that is included in the PCIe device and that provides a first PCIe configuration space register;
determine, using first register value information in the first PCIe setting record, at least one register value change for the first PCIe configuration space register; and
write, using the location in the PCIe configuration space that provides the first PCIe configuration space register, the at least one register value change to the first PCIe configuration space register.

8. The IHS of claim 7, wherein the determining the at least one register value change for the first PCIe configuration register includes determining a plurality of register value changes for the first PCIe configuration space register using an AND mask and an OR mask included in the first register value information, and wherein the plurality of value changes are written to the first PCIe configuration space register using the location in the PCIe configuration space that provides the first PCIe configuration space register.

9. The IHS of claim 7, wherein the operating system engine is configured to:
read, prior to determining the at least one register value change for the first PCIe configuration register, the first PCIe configuration space register to identify a plurality of default values included in the first PCIe configuration space register, wherein at least one of the plurality of default values is overwritten with the at least one register value change.

10. The IHS of claim 7, wherein the first PCIe setting record includes capability structure information for the first PCIe configuration space register, and wherein the operating system engine is configured to:
determine, using the capability structure information and the first register write location value in the first PCIe setting record, the location in the PCIe configuration space that provides the first PCIe configuration space register.

11. The IHS of claim 10, wherein the capability structure information identifies whether the first PCIe configuration space register is located in a capability structure included in the PCIe configuration space, or located in an extended capability structure included in the PCIe configuration space.

12. The IHS of claim 10, wherein the first PCIe setting record includes a PCIe capability identifier for the first PCIe configuration space register, and wherein the operating system engine is configured to:
determine, using the capability structure information, a structure in the PCIe configuration space that includes the first PCIe configuration space register;
determine, using the PCIe capability identifier for the first PCIe configuration space register, a start point of the first PCIe configuration space register in the structure in the PCIe configuration space; and
determine, using the first register write location value in the first PCIe setting record, an offset from the start point that provides the location in the PCIe configuration space that provides the first PCIe configuration space register.

13. The IHS of claim 7, wherein operating system engine is configured to:
advertise operating system support for the first PCIe setting record.

14. A method for configuring a hot-plugged Peripheral Component Interconnect express (PCIe) device, comprising:
receiving, by an operating system in a computing system during computing system initialization operations, a first PCIe setting record included in a PCI setting record database;

detecting, by the operating system during computing system runtime operations, that a PCIe device has been hot-plugged to a PCIe connector;

determining, by the operating system using a first register write location value in the first PCIe setting record, a location in a PCIe configuration space that is included in the PCIe device and that provides a first PCIe configuration space register;

determining, by the operating system using first register value information in the first PCIe setting record, at least one register value change for the first PCIe configuration space register; and writing, by the operating system using the location in the PCIe configuration space that provides the first PCIe configuration space register, the at least one register value change to the first PCIe configuration space register.

15. The method of claim 14, wherein the determining the at least one register value change for the first PCIe configuration register includes determining a plurality of register value changes for the first PCIe configuration space register using an AND mask and an OR mask included in the first register value information, and wherein the plurality of value changes are written to the first PCIe configuration space register using the location in the PCIe configuration space that provides the first PCIe configuration space register.

16. The method of claim 14, further comprising:

reading, by the operating system prior to determining the at least one register value change for the first PCIe configuration register, the first PCIe configuration space register to identify a plurality of default values included in the first PCIe configuration space register, wherein at least one of the plurality of default values is overwritten with the at least one register value change.

17. The method of claim 14, wherein the first PCIe setting record includes capability structure information for the first PCIe configuration space register, and wherein the method further comprises:

determining, by the operating system using the capability structure information and the first register write location value in the first PCIe setting record, the location in the PCIe configuration space that provides the first PCIe configuration space register.

18. The method of claim 17, wherein the capability structure information identifies whether the first PCIe configuration space register is located in a capability structure included in the PCIe configuration space, or located in an extended capability structure included in the PCIe configuration space.

19. The method of claim 17, wherein the first PCIe setting record includes a PCIe capability identifier for the first PCIe configuration space register, and wherein the method further comprises:

determining, by the operating system using the capability structure information, a structure in the PCIe configuration space that includes the first PCIe configuration space register;

determining, by the operating system using the PCIe capability identifier for the first PCIe configuration space register, a start point of the first PCIe configuration space register in the structure in the PCIe configuration space; and determining, by the operating system using the first register write location value in the first PCIe setting record, an offset from the start point that provides the location in the PCIe configuration space that provides the first PCIe configuration space register.

20. The method of claim 14, further comprising:

advertising, by the operating system, support for the first PCIe setting record.

* * * * *